F. N. TAFF.
CULTIVATOR.
APPLICATION FILED JULY 1, 1912.
1,062,374.
Patented May 20, 1913.
2 SHEETS—SHEET 1.
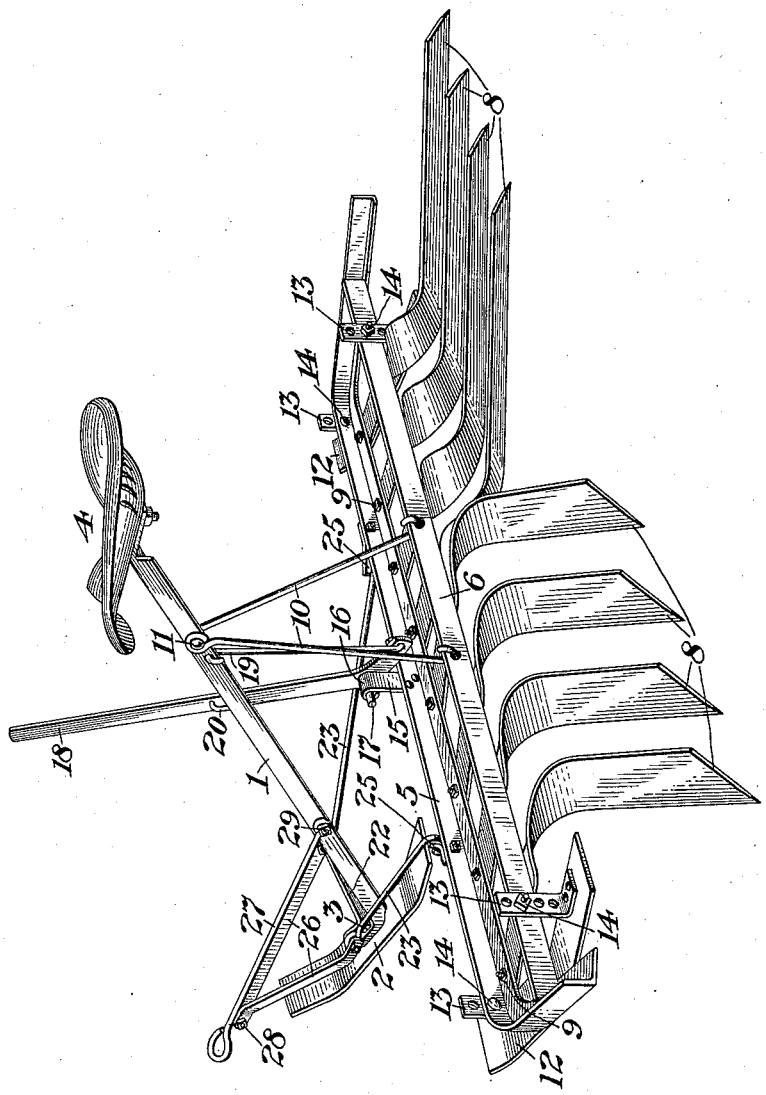
Witnesses;
Chas. F. Clagett
Geo. T. Pinckney
Inventor,
Frederick N. Taff.
By Serrell & Son,
his Attorneys.

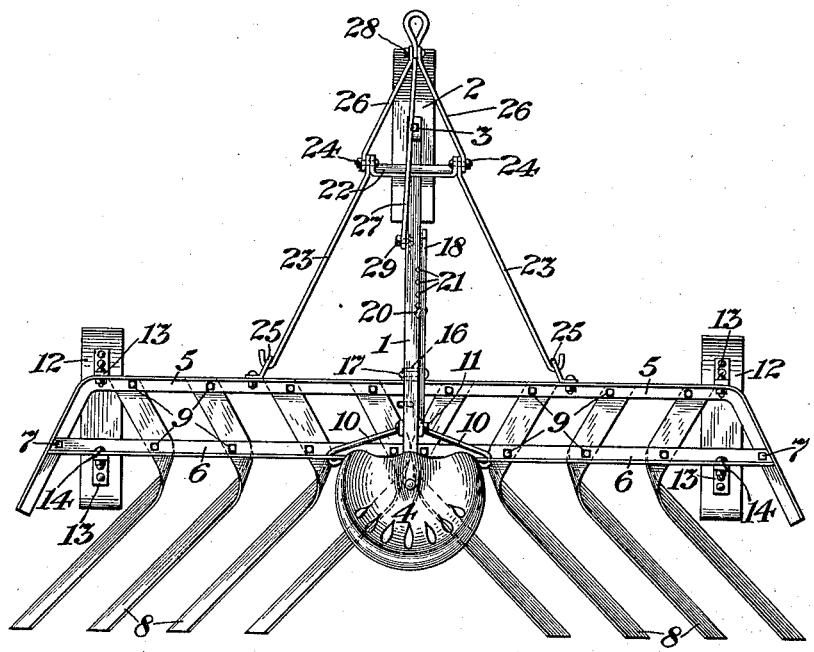
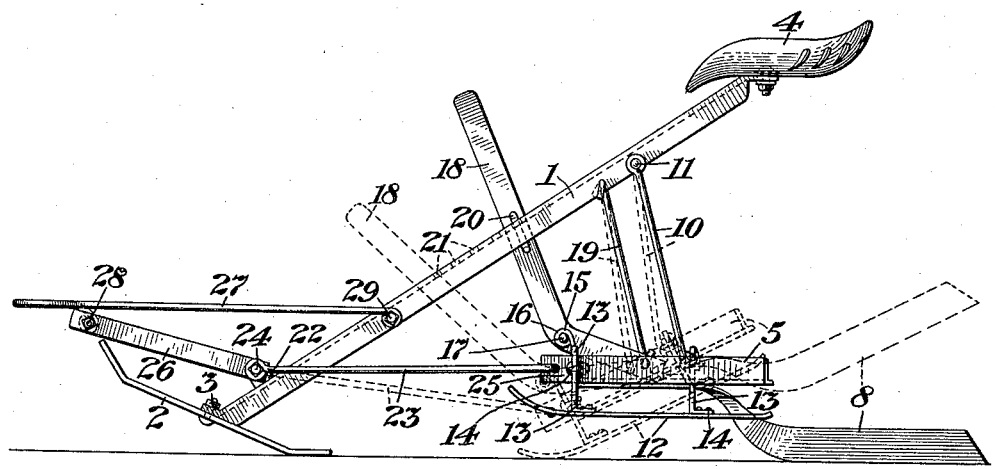

UNITED STATES PATENT OFFICE.

FREDERICK N. TAFF, OF MILLINGTON, NEW JERSEY, ASSIGNOR TO DUANE H. NASH INC., OF MILLINGTON, NEW JERSEY, A CORPORATION OF NEW JERSEY.

CULTIVATOR.

1,062,374.     Specification of Letters Patent.     Patented May 20, 1913.

Application filed July 1, 1912.   Serial No. 706,871.

*To all whom it may concern:*

Be it known that I, FREDERICK N. TAFF, a citizen of the United States, residing at Millington, in the county of Morris and State of New Jersey, have invented an Improvement in Cultivators, of which the following is a specification.

My invention relates to that class of agricultural machines designed for weeding purposes particularly in the vicinity of fragile vegetation and trees.

The details of construction of my invention are hereinafter fully described and the novel features particularly pointed out.

In the accompanying drawing in which like reference characters denote corresponding parts in the several views, Figure 1 is a perspective view showing the machine in a working position. Fig. 2 is a plan view of the same, and Fig. 3 is a side elevation, showing the machine with the colters raised, in dotted or broken lines.

1 indicates an inclined standard, having its lower end resting upon a shoe 2, which shoe is secured at about its center to the standard by bolts or rivets 3 or in any suitable manner. This shoe 2 is made preferably of a flat piece of metal with its ends upwardly inclined as shown. At the upper end of the standard 1 a driver's seat 4 is secured in any suitable manner.

5 is a gang bar preferably formed of angle iron and having its ends bent rearwardly a predetermined distance at an oblique angle. 6 is a cross bar also preferably made of angle iron and which is secured at each end to the rearward projections of the gang bar 5, by bolts or rivets 7, so that it is in a parallel line with the forward or main body of the gang bar 5.

8 indicates spaced apart cultivator blades or colters the forward portions of which are in a horizontal plane and are secured to both the gang bar 5 and cross bar 6 by bolts or rivets 9. These colters 8 at the rear of the cross bar 6, are twisted into vertically inwardly inclined positions, so that the inclination of the blades on one side of the machine is opposite to that of the blades on the other side of the machine.

10, 10, are two hangers the upper ends of which are pivotally connected to the standard 1 by a pivot pin or bolt 11. The lower ends of these hangers 10 are spread apart and formed with hooks which pass through spaced apart holes in the cross bar 6.

12, 12 are two runners, one at each side of the machine. These runners are secured to both the gang bar 5 and cross bar 6 by means of angle iron 13 and bolts 14. The lower ends of these angle irons 13 are secured to the runners while their upright portions are provided with spaced holes for the bolts 14 and by which means they are vertically adjustable upon the gang and cross bars.

15 is a vertical stud, the lower end of which is rigidly secured to the gang bar 5, at about the center thereof by rivets or in any suitable manner. The upper end of the stud is formed as a sleeve 16 to receive the pivot pin 17 of the hand lever 18. The lever 18 is curved rearwardly at its pivotal point and its lower end extends past this point for a predetermined distance and is provided with a hole to receive the hooked lower end of the rod 19. The upper end of this lever rod 19 is also hooked and passes through a hole in the standard 1 forward of the hangers 10. The lever 18 swings closely adjacent the right hand side of the standard 1 and is provided on its inner surface with a lug or projection 20 which is adapted to lock into the spaced notches or recesses 21 on the side of the standard 1.

22 is a cross bar secured to the standard 1 adjacent its lower end and having its ends bent at right angles and provided with bolt holes.

23, 23 are two connecting rods between the cross bar 22 and the gang bar 5. One end of each of these rods 23 is provided with an eye to receive a bolt and they are thus pivotally connected at such end to the cross bar 22, by bolts 24; the other ends of these rods 23, are hook shaped and pass through holes in lugs 25, upon the front of the gang bar 5.

26, 26 are two metallic straps one end of each of which is pivotally connected with the cross bar 22 by the bolts 24, while their other ends are drawn together and receive between them the end of a draft rod 27 which is provided with a bolt hole as are also the said ends of the straps 26 which are secured together by a bolt 28, while at the same time the said end of the draft rod 27 is pivotally secured between said ends of the straps 26 by said bolt 28. This draft rod 27 is looped at the point projecting from between the ends of said straps 26, and extends back to the standard 1 as a straight rod where its end is pivotally connected to the standard 1 by a bolt 29. This looped end of the draft rod 27 provides means for connecting a whiffletree in the usual manner.

The depth of tilth may be regulated by the lever 18 which may be locked in the desired positions by means of the lug 20 thereon taking into the notches 21 on the standard; and when desired the colters may be raised clear of the ground by the same means, as shown in Fig. 3, in dotted or broken lines. The bent and rearwardly extending ends of the gang bar 5 form guard arms which prevent the colters from coming into contact with trees and other like objects, and which in case the machine is driven too near such object will warn the driver in time to prevent injury to the same.

I claim as my invention:

1. A cultivator comprising a standard, a shoe attached to the lower end of the standard, a gang bar, a cross bar rigidly secured to said gang bar and jointedly connected with the standard, runners adjustably connected with the gang bar, spaced colters, one end of each of which is secured to said gang bar and said cross bar, and means for adjusting the colters relatively to the ground.

2. A cultivator comprising a standard, a shoe attached to the lower end of the standard, a gang bar having its ends bent rearwardly at an angle to form guard arms, a cross bar rigidly secured to said arms and jointedly connected with the standard, spaced colters, one end of each of which is secured to said gang bar and said cross bar, and a hand lever for adjusting the colters relatively to the ground.

3. A cultivator comprising a standard, a shoe attached to the lower end of the standard, a gang bar having its ends bent rearwardly at an angle to form guard arms, a cross bar, hangers forming jointed connections between said cross bar and said standard, spaced colters, one end of each of which is secured to said gang bar and said cross bar, and a hand lever for adjusting the colters relatively to the ground.

4. A cultivator comprising a standard, a shoe attached to the lower end of the standard, a gang bar, a cross bar, jointedly connected with the standard, runners adjustably connected to the gang bar, spaced colters, one end of each of which is secured to said gang bar and said cross bar, and a hand lever for adjusting the colters relatively to the ground.

5. A cultivator comprising a standard, a shoe attached to the lower end of the standard, a gang bar, having its ends bent rearwardly at an angle to form guard arms, a cross bar secured at its respective ends to said arms, jointed connections between said cross bar and the standard, runners adjustably connected to the gang bar and to said cross bar, spaced colters, one end of each of which is secured to said gang bar and to said cross bar, and a hand lever for adjusting the colters relatively to the ground.

6. A cultivator comprising a standard having spaced notches on one side, a shoe attached to the lower end of the standard, a driver's seat attached to the upper end of said standard, a gang bar, having its ends bent rearwardly at an angle to form guard arms, a cross bar secured at its respective ends to said arms and jointedly connected with the standard, runners adjustably connected to the gang bar and to said cross bar, spaced colters, one end of each of which is secured to said gang bar and to said cross bar, a stud upon the gang bar, a lever pivoted to said stud, a connecting rod between the lower end of said lever and the standard, said lever being provided with a lug adapted to take into the notches on the side of the standard and thereby lock the colters in the position to which they may be adjusted relatively to the ground.

7. A cultivator comprising a standard having spaced notches on one side thereof, a shoe attached to the lower end of the standard, a driver's seat attached to the upper end of said standard, a gang bar having its ends bent rearwardly at an angle to form guard arms, a cross bar secured at its respective ends to said arms, hangers forming jointed connections between said cross bar and the standard, runners adjustably connected to the gang bar and to said cross bar, spaced colters, one end of each of which is secured to said gang bar and to said cross bar, a cross bar secured to the standard adjacent its lower end, connecting rods between said cross bar and said gang bar, straps pivotally connected at one end to said cross bar upon the standard, a bolt by which the other ends of the straps are drawn together, a draft rod secured at one end to the standard and having its other end pivotally held between said straps by said bolt, there being a loop in said draft rod for attachment of the whiffletree, a stud upon the gang bar, a lever pivoted to said stud, a connecting rod between the lower end of said lever and the standard, said lever being provided with a lug adapted to take into the notches on the side of the standard and thereby lock the colters in the position to which they may be adjusted relatively to the ground.

Signed by me this 24th day of June, 1912.

FREDK. N. TAFF.

Witnesses:
Geo. T. Pinckney,
Bertha M. Allen.